(12) United States Patent
Saotome et al.

(10) Patent No.: US 6,542,771 B2
(45) Date of Patent: Apr. 1, 2003

(54) METHOD OF AND SYSTEM FOR DETECTING PROSPECTIVE ABNORMAL SHADOW AND METHOD OF REPRODUCING RADIATION IMAGE

(75) Inventors: Shigeru Saotome, Kaisei-machi (JP); Kazuo Shimura, Kaisei-machi (JP); Takeshi Ohkubo, Kaisei-machi (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/875,914

(22) Filed: Jun. 8, 2001

(65) Prior Publication Data

US 2002/0018586 A1 Feb. 14, 2002

(30) Foreign Application Priority Data

Jun. 8, 2000 (JP) .......................... 2000-172229

(51) Int. Cl.$^7$ ................................ A61B 5/05
(52) U.S. Cl. .................. 600/425; 382/132; 382/128
(58) Field of Search .................. 382/132, 128; 378/37; 364/415; 600/425

(56) References Cited

U.S. PATENT DOCUMENTS

| | | | | |
|---|---|---|---|---|
| 4,258,264 A | | 3/1981 | Kotera et al. | 250/484 |
| 4,346,295 A | | 8/1982 | Tanaka et al. | 250/327.2 |
| 4,485,302 A | | 11/1984 | Tanaka et al. | 250/327.2 |
| 4,731,725 A | * | 3/1988 | Suto et al. | 364/415 |
| 5,579,360 A | * | 11/1996 | Abdel-Mottaleb | 378/37 |
| 5,761,334 A | * | 6/1998 | Nakajima | 382/132 |
| 6,282,305 B1 | * | 8/2001 | Huo et al. | 382/128 |

FOREIGN PATENT DOCUMENTS

| | | | |
|---|---|---|---|
| JP | 55-12429 | 1/1980 | G01T/1/10 |
| JP | 56-11395 | 2/1981 | G21K/4/00 |
| JP | 56-11397 | 2/1981 | G21K/4/00 |
| JP | 8-294479 | 11/1996 | A61B/6/00 |

* cited by examiner

Primary Examiner—Henry Bennett
Assistant Examiner—Sabrina Dagostino
(74) Attorney, Agent, or Firm—Sughrue Mion, PLLC

(57) ABSTRACT

A primary prospective abnormal shadow is detected in each of at least two radiation images of an object taken in different directions. Only primary prospective abnormal shadows which are detected in the respective radiation images and are in substantially the same position on the object is taken as a final prospective abnormal shadow.

14 Claims, 6 Drawing Sheets

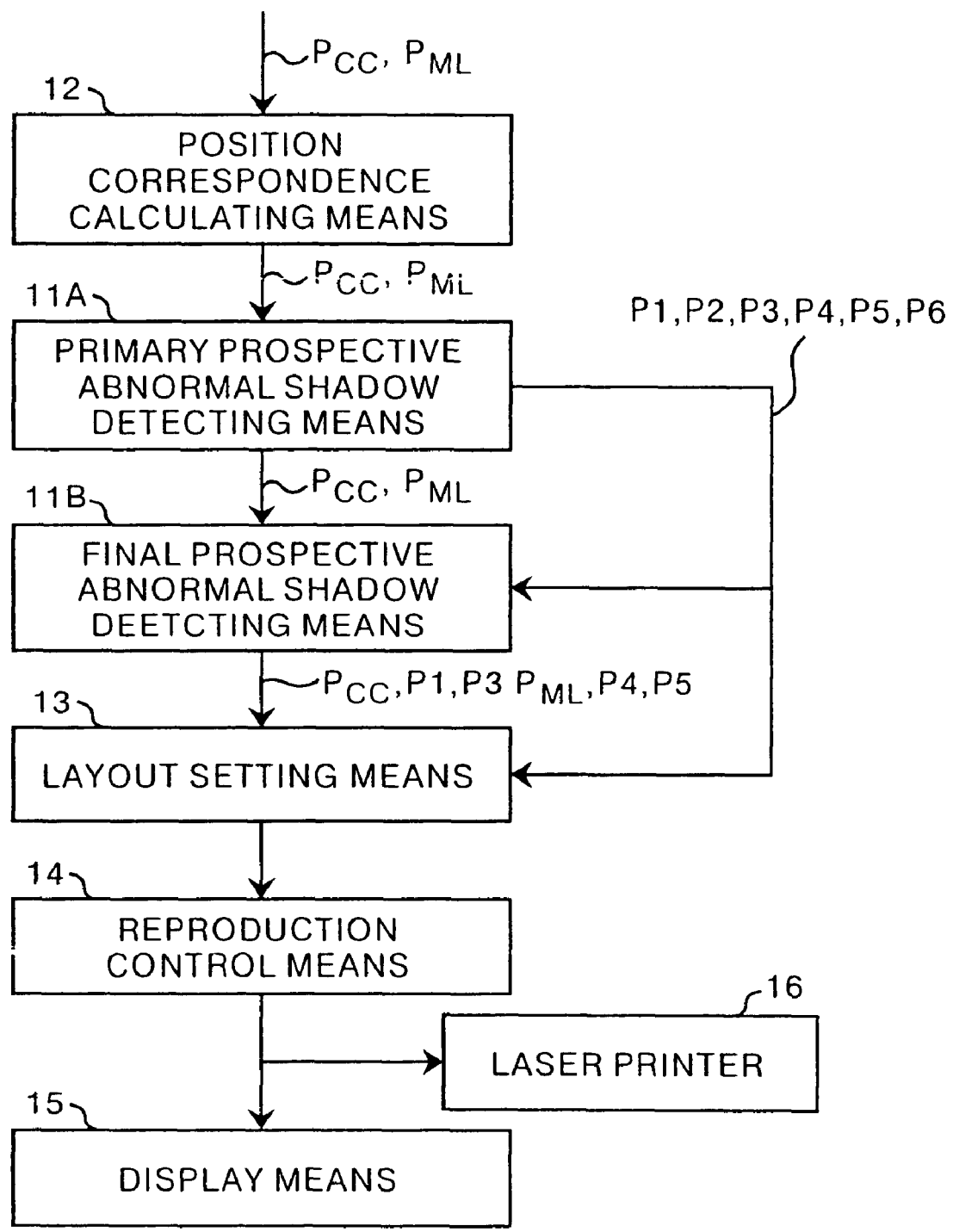

METHOD OF AND SYSTEM FOR DETECTING PROSPECTIVE ABNORMAL SHADOW AND METHOD OF REPRODUCING RADIATION IMAGE

BACKGROUND OF THE INVENTION

1. Field of the Invention

This invention relates to a method of and a system for detecting a prospective abnormal shadow in a radiation image and a method of reproducing a radiation image.

2. Description of the Related Art

Conventionally, disease or injury of a patient has been sometimes diagnosed by reading an X-ray film on which a radiation image of the patient is recorded. Recently, there has been developed a system in which a radiation image of a patient is once stored on a stimulable phosphor sheet (or a radiation image conversion panel) by exposing the stimulable phosphor sheet to radiation through the object (patient) to have the stimulable phosphor sheet store radiation energy, and stimulated emission which is emitted from each part of the stimulable phosphor sheet upon exposure to stimulating light in proportion to the radiation energy stored thereon is digitally read, thereby obtaining a digital image signal representing the radiation image stored on the stimulable phosphor sheet, and the digital image signal is reproduced as a visible image on a recording medium such as a photographic film or on an image display system such as those using a CRT. (A radiation image recording and read-out apparatus: computed radiography, see, for instance, Japanese Unexamined Patent Publication Nos. 55(1975)-12429, 56(1976)-11395 and 56(1976)-11397)

In accordance with such a radiation image recording and read-out apparatus, by carrying out image processing on the digital image signal in various ways, the tone properties and the frequency properties of the output visible image can be improved so that the visible image becomes more suitable for reading and diagnose through the visible image can be made more correctly.

Further, there has been developed a system in which the digital image signal is analyzed by a computer to automatically detect an abnormal shadow representing a growth, a micro calcification or the like, whereby a certain detecting level can be ensured irrespective of the skillfulness of the reader. (Prospective abnormal shadow detecting system: see, for instance, Japanese Unexamined Patent Publication Nos. 8(1996)-294479)

In this system, the degree of convergence of density (signal value) gradient vectors is evaluated in a digital image signal of a breast (a mammogram) mainly obtained by breast cancer examination, thereby automatically detecting a prospective growth shadow in the radiation image, or a prospective micro calcification shadow is automatically detected by carrying out morphology operation (e.g., dilation processing, erosion processing, opening processing, and closing processing). The prospective abnormal shadow thus detected is marked with a ROI frame or the like on a visible image reproduced on a display such as of a CRT or a liquid crystal display or on a print. Then the display or the print is used for diagnosis.

Though being substantially high in detecting accuracy, the prospective abnormal shadow detecting system cannot detect an abnormal shadow at one-hundred percent accuracy at present. That is, the conventional prospective abnormal shadow detecting system cannot perfectly remove noise of radiation and/or other noise generated at random and sometimes mistakes such noise for a prospective abnormal shadow. Further it sometimes mistakes normal tissues or normal structures such as the mammary glands for a prospective abnormal shadow. Accordingly, there has been a strong demand for a prospective abnormal shadow detecting system which can detect a prospective abnormal shadow at a higher accuracy.

SUMMARY OF THE INVENTION

In view of the foregoing observations and description, the primary object of the present invention is to provide a prospective abnormal shadow detecting method and a prospective abnormal shadow detecting system which can detect a prospective abnormal shadow more accurately.

Another object of the present invention is to provide a radiation image reproducing method which can reproduce a radiation image with a prospective abnormal shadow clearly separated from a normal shadow.

In accordance with the present invention, at least two radiation images of an object are taken in different directions, prospective abnormal shadows are detected in the respective radiation images, and when prospective abnormal shadows detected in the respective radiation images are in substantially the same position on the object, the prospective abnormal shadows detected in the respective radiation images are taken as one final prospective abnormal shadow.

That is, when a tumor or the like which is observed as an abnormal shadow on a radiation image really exists on the object, an abnormal shadow should be detected in the same position in each of radiation images taken in different directions, whereas there is little probability that noise or the like which is generated at random is detected in the same position in each of radiation images taken in different directions. In the case of a normal tissue or a normal structure such as the mammary glands which really exists in the object, there is little probability that such a normal tissue is mistaken for an abnormal shadow in all the radiation images taken in different directions since such a normal tissue is viewed in different shapes according to the direction of taking a radiation image.

This invention has been made on the basis of such a recognition, and in accordance with a first aspect of the present invention, there is provided a prospective abnormal shadow detecting method for detecting a prospective abnormal shadow in a radiation image, characterized by the steps of detecting a prospective abnormal shadow in each of at least two radiation images of an object taken in different directions, determining correspondence of positions on the object between the radiation images, and taking, as a final prospective abnormal shadow, only prospective abnormal shadows which are detected in the respective radiation images and are in substantially the same position on the object.

Preferably a prospective abnormal shadow in each radiation image is detected by a method disclosed, for instance, in Japanese Unexamined Patent Publication Nos. 8(1996)-294479) in which the degree of convergence of density (signal value) gradient vectors is evaluated in a digital image signal, thereby automatically detecting a prospective growth shadow in the radiation image, or a prospective micro calcification shadow is automatically detected by carrying out morphology operation (e.g., dilation processing, erosion processing, opening processing, and closing processing).

The final prospective abnormal shadow is a prospective abnormal shadow which is more probable than that detected in only one of the radiation images.

"Determining correspondence of positions on the object between the radiation images" need not be effected three-dimensionally. That is, since the radiation image is only a projection of a three-dimensional object on a two-dimensional plane, positions in the direction of taking the radiation image (in the direction of depth of the radiation image) cannot be obtained from each radiation image. Accordingly, correspondence of positions on the object between the radiation images can be determined only with respect to a direction perpendicular to the planes on which the radiation images are projected. Thus, correspondence of positions on the object between the radiation images may be determined only in one-dimension.

That is, "the expression that the prospective abnormal shadows are in the same position on the object" need not be interpreted that the positions of the prospective abnormal shadows are three-dimensionally the same as each other but should be interpreted to include the case where the positions of the prospective abnormal shadows are the same as each other only in a predetermined direction but the direction of depth of the radiation image. Further, the expression "in substantially the same position" means that the prospective abnormal shadows need not be strictly in the same position but they are considered to be in the same position when they are close to each other to such an extent that they are adjacent to each other. Especially when the radiation images are not taken simultaneously, the positions on the object are affected by the posture of the object. Accordingly, the range over which the prospective abnormal shadows may be considered to be in substantially the same position may be set to a range which can be empirically considered to be reasonable, e.g., to include a case where the prospective abnormal shadows partly overlap each other or are adjacent to each other.

As the "at least two radiation images of an object taken in different directions" may be, for instance, a cranio-caudal view of the breast taken with the breast compressed laterally and a medio-lateral view or a medio-lateral oblique view taken with the breast compressed vertically, or a front image of the breast and a side image of the breast. In the case of a mammogram where the object is the breast, an abnormal shadow rarely overlaps other shadows and correspondence of positions on the object between the radiation images can be easily determined by the use of the nipple or the wall of the chest. Accordingly, the present invention can be effectively applied to mammograms. Since the mammograms are taken with the breast pressed in different directions according to the direction of taking the mammogram, the state of deformation of the breast can vary according to the direction of taking the mammogram. In such a case, the distance between a given position on the object and a reference position (e.g., the chest wall or the nipple) varies by the state of deformation of the breast and correspondence of positions on the object between the radiation images is broken. In such a case, for example, when the ratio of the distance of a prospective abnormal shadow in one radiation image from one reference position to the distance of the same from another reference position is equal to the ratio of the distance of a prospective abnormal shadow in the other radiation image from one reference position to the distance of the same from another reference position, the prospective abnormal shadows in the respective radiation images may be considered to be in substantially the same position on the object. That is, whether prospective abnormal shadows in two radiation images are in substantially the same position on the object may be determined on the basis of not only the distance but also, for instance, the ratio of distances.

It is preferred that only when prospective abnormal shadows detected in the respective radiation images are in substantially the same position on the object and at the same time are detected to be the abnormal shadows of the same kind, they are taken as the final prospective abnormal shadow. For example, when the prospective abnormal shadow detected in one of the radiation images is a growth shadow and the prospective abnormal shadow detected in the other radiation image is a micro calcification shadow, they are not taken as a final prospective abnormal shadow.

It is preferred that "the degree of sureness of detection" is determined for the prospective abnormal shadows, and when a prospective abnormal shadow is detected in two or more radiation images and only prospective abnormal shadows which are detected in all the radiation images and are all in substantially the same position on the object are taken as a final prospective abnormal shadow, the degree of sureness of detection for the prospective abnormal shadow is increased.

As disclosed, for instance, in Japanese Patent Application No. 2000-38298, "the degree of sureness" is an index which represents the degree of probability at which the final prospective abnormal shadow really exists. For example, when the final prospective abnormal shadows determined in accordance with the first aspect of the present invention are displayed together with the primary prospective abnormal shadows, the former are given a higher degree of sureness and the latter are given a lower degree of sureness.

In accordance with a second aspect of the present invention, there is provided a radiation image reproducing method characterized in that the final prospective abnormal shadow is reproduced to be distinguishable from the prospective abnormal shadows detected in the respective radiation images (will be referred to as "the primary prospective abnormal shadows", hereinbelow).

For example, the final prospective abnormal shadow and/or the primary prospective abnormal shadows may be reproduced as visible images on a display screen of an image display means such as a CRT or a liquid crystal display or may be reproduced as a hard copy recorded on a recording medium such as a photographic film by a printer such as a laser printer.

That the final prospective abnormal shadow is reproduced to be distinguishable from the primary prospective abnormal shadows does not always require that the final prospective abnormal shadow is reproduced together with the primary prospective abnormal shadows. Only the final prospective abnormal shadow may be reproduced so long as the reader can recognize that the reproduced image is of the final prospective abnormal shadow.

It is preferred that the at least two radiation images be reproduced side by side so that the reader can recognize correspondence between the prospective abnormal shadows at a glance.

When the visible images are reproduced on a display screen of an image display means, the layout of the images and the like can be easily and quickly changed on demand.

In accordance with a third aspect of the present invention, there is provided a prospective abnormal shadow detecting system comprising a primary prospective abnormal shadow detecting means which detects a primary prospective abnormal shadow in each of at least two radiation images of an object taken in different directions, a position correspondence calculating means which determines correspondence of positions on the object between the radiation images, and a final prospective abnormal shadow detecting means which takes, as a final prospective abnormal shadow, only prospective abnormal shadows which are detected in the respective radiation images and are in substantially the same position on the object.

It is preferred that the at least two radiation images of an object taken in different directions be a cranio-caudal view of the breast taken with the breast compressed laterally and a medio-lateral view or a medio-lateral oblique view taken with the breast compressed vertically.

It is preferred that only when the primary prospective abnormal shadows detected in the respective radiation images are in substantially the same position on the object and at the same time are detected to be the prospective abnormal shadows of the same kind, the final prospective abnormal shadow detecting means takes them as the final prospective abnormal shadow.

It is further preferred that the prospective abnormal shadow detecting system is further provided with a reproduction control means which controls a reproducing means to reproduce the final prospective abnormal shadow to be distinguishable from the primary prospective abnormal shadows. In this case, it is further preferred that the reproduction control means is further provided with a layout setting means which causes the reproducing means to reproduce the final prospective abnormal and the primary prospective abnormal shadows side by side.

It is preferred that the reproducing means is of a type which reproduces an image on a display screen.

It is preferred that a determining means which determines the degree of sureness of detection for the prospective abnormal shadows be provided, and when the primary prospective abnormal shadow detecting means detects a prospective abnormal shadow in two or more radiation images and the final prospective abnormal shadow detecting means takes as a final prospective abnormal shadow only prospective abnormal shadows which are detected in all the radiation images and are all in substantially the same position on the object, the determining means increases the degree of sureness of detection for the prospective abnormal shadow.

BRIEF DESCRIPTION OF THE DRAWINGS

FIG. 6 is a schematic view showing a prospective abnormal shadow detecting system in accordance with another embodiment of the present invention.

DESCRIPTION OF THE PREFERRED EMBODIMENTS

Figure 1:
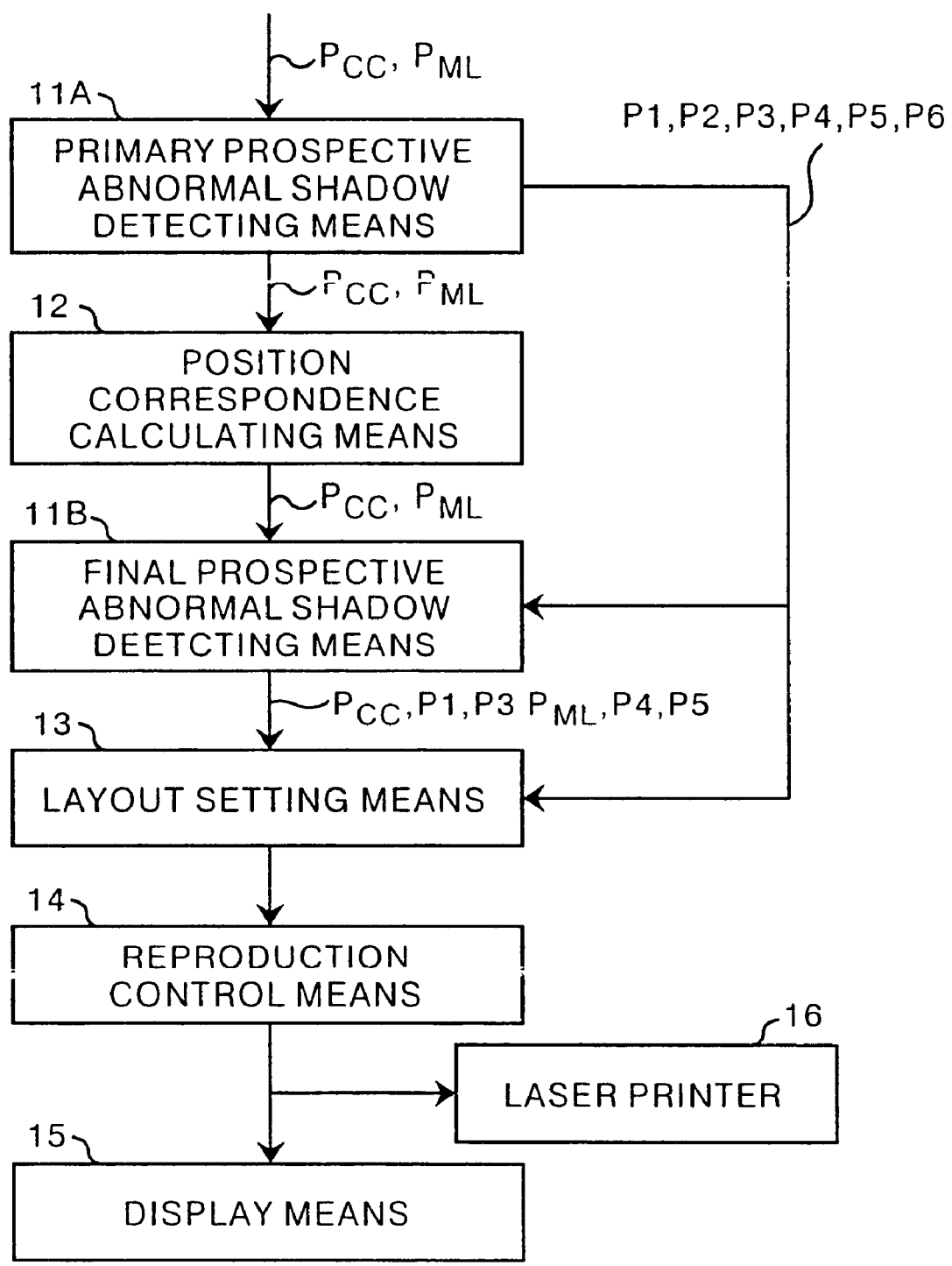
FIG. 1 is a schematic view showing a prospective abnormal shadow detecting system in accordance with an embodiment of the present invention.
Figure 2A:
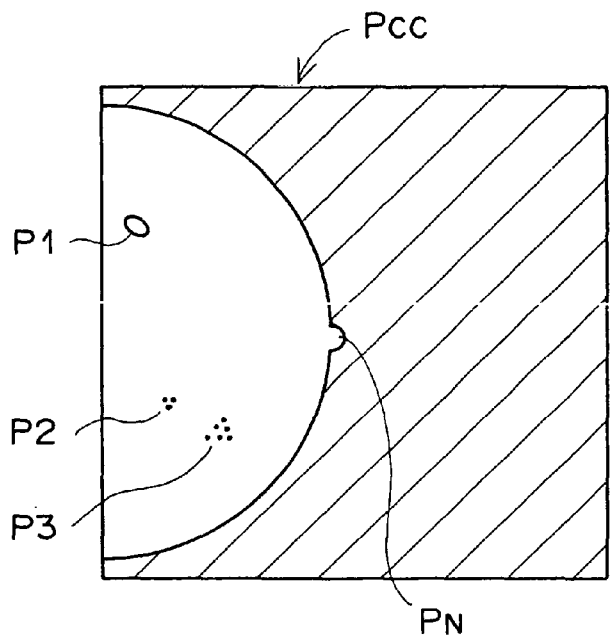
FIGS. 2A and 2B are views showing an example of mammograms employed in the prospective abnormal shadow detecting system of the embodiment.

FIG. 1 shows a prospective abnormal shadow detecting system 10 of an embodiment of the present invention. FIG. 2A is a cranio-caudal view $P_{CC}$ of the breast taken with the breast compressed laterally and a medio-lateral view $P_{ML}$ taken with the breast compressed vertically.

In FIG. 1, the prospective abnormal shadow detecting system 10 comprises a primary prospective abnormal shadow detecting means 11A which receives image signals representing the cranio-caudal view $P_{CC}$ and the medio-lateral view $P_{ML}$ and detects a primary prospective abnormal shadow (a prospective growth shadow and a prospective micro calcification shadow) in each of the cranio-caudal view $P_{CC}$ and the medio-lateral view $P_{ML}$, a position correspondence calculating means 12 which determines correspondence of positions on the breast between the mammograms $P_{CC}$ and $P_{ML}$, a final prospective abnormal shadow detecting means 11B which takes only prospective abnormal shadows which are detected in the respective mammograms $P_{CC}$ and $P_{ML}$, are in substantially the same position on the breast, and are of the same kind (a growth shadow or a micro calcification shadow) as a final prospective abnormal shadow on the basis of the correspondence of positions determined by the position correspondence calculating means 12, a display means 15 which reproduces the mammograms $P_{CC}$ and $P_{ML}$ including the primary prospective abnormal shadows and the final prospective abnormal shadows, if any, as a visible image on its display screen, a laser printer 16 which prints the mammograms $P_{CC}$ and $P_{ML}$ including the primary prospective abnormal shadows and the final prospective abnormal shadows, if any, as a visible image on a diagnostic film, a layout setting means 13 which sets the layout of the visible image reproduced by the display means 15 and the laser printer 16, and a reproduction control means 14 which controls the display means 15 and the laser printer 16 to reproduce the mammograms $P_{CC}$ and $P_{ML}$ so that the final prospective abnormal shadows are distinguishable from the primary prospective abnormal shadows.

The primary prospective abnormal shadow detecting means 11A detects a prospective abnormal shadow in each of the mammograms $P_{CC}$ and $P_{ML}$ by a method disclosed, for instance, in Japanese Unexamined Patent Publication Nos. 8(1996)-294479) in which the degree of convergence of density (signal value) gradient vectors is evaluated in a digital image signal representing each of the mammograms $P_{CC}$ and $P_{ML}$, thereby detecting a prospective growth shadow in the radiation image, and a prospective micro calcification shadow is detected by carrying out morphology operation on the digital image signal representing each of the mammograms $P_{CC}$ and $P_{ML}$.

Figure 2B:
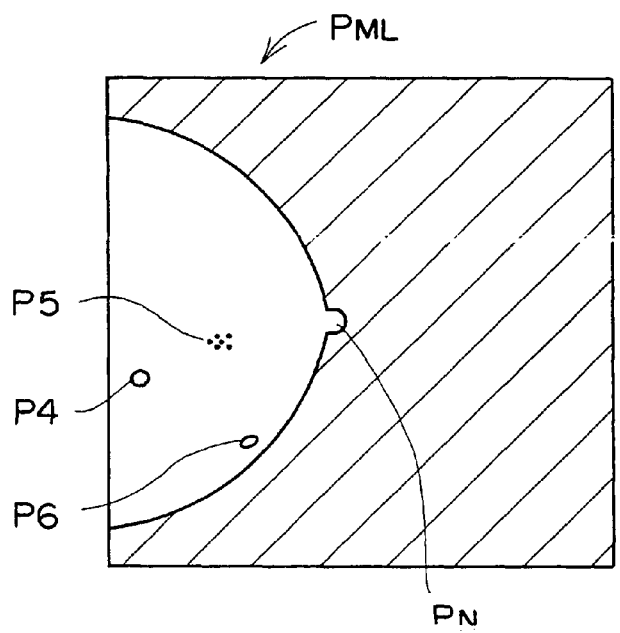

The position correspondence calculating means 12 detects a reference part (e.g., the nipple PN or the chest wall) in each of the mammograms $P_{CC}$ and $P_{ML}$ and determines correspondence of positions on the breast between the mammograms $P_{CC}$ and $P_{ML}$ in the lateral direction as seen in FIGS. 2A and 2B (back and forth as seen on the breast) on the basis of the positions of the nipple PN or the chest wall PK in the mammograms $P_{CC}$ and $P_{ML}$. The reference part can be detected by known methods on the basis of the features in shape, features in position, and the like of such a part. For example, the nipple PN generally appears at the rightmost edge of the image and accordingly, on the basis of the fact, can be easily detected, for instance, by edge detection processing. The chest wall PK clearly differs from the breast in density on the radiation image, and accordingly the boundary between the chest wall PK and the breast can be easily detected, for instance, by edge detection processing.

The final prospective abnormal shadow detecting means 11B takes primary prospective abnormal shadows respectively detected in the mammograms $P_{CC}$ and $P_{ML}$ as a final prospective abnormal shadow when it is determined on the basis of the correspondence of the positions determined by the position correspondence calculating means 12 that they are in substantially the same position on the breast in the lateral direction and when they are of the same kind. Whether the primary prospective abnormal shadows are in substantially the same position may be determined according to whether their relative positions are in a preset permissible range. That is, when the relative positions of the primary prospective abnormal shadows are in the permissible range, it is determined that the primary prospective abnormal shadows are in substantially the same position, and otherwise, it is determined that they are not in substantially the same position. The permissible range may be set according to the age, the figure or the like of the object and/or the kind of the abnormal shadow to be detected.

The layout setting means 13 sets the layout of the visible image reproduced by the display means 15 and the laser printer 16 so that the mammograms $P_{CC}$ and $P_{ML}$ including the primary prospective abnormal shadows and the final prospective abnormal shadows, if any, are reproduced as visible images side by side with the prospective abnormal shadows circumscribed by square frames. The layout setting means 13 may be arranged to be able to cause the display means 15 and the laser printer 16 to reproduce the mammograms $P_{CC}$ and $P_{ML}$ in other layouts.

Figure 4:
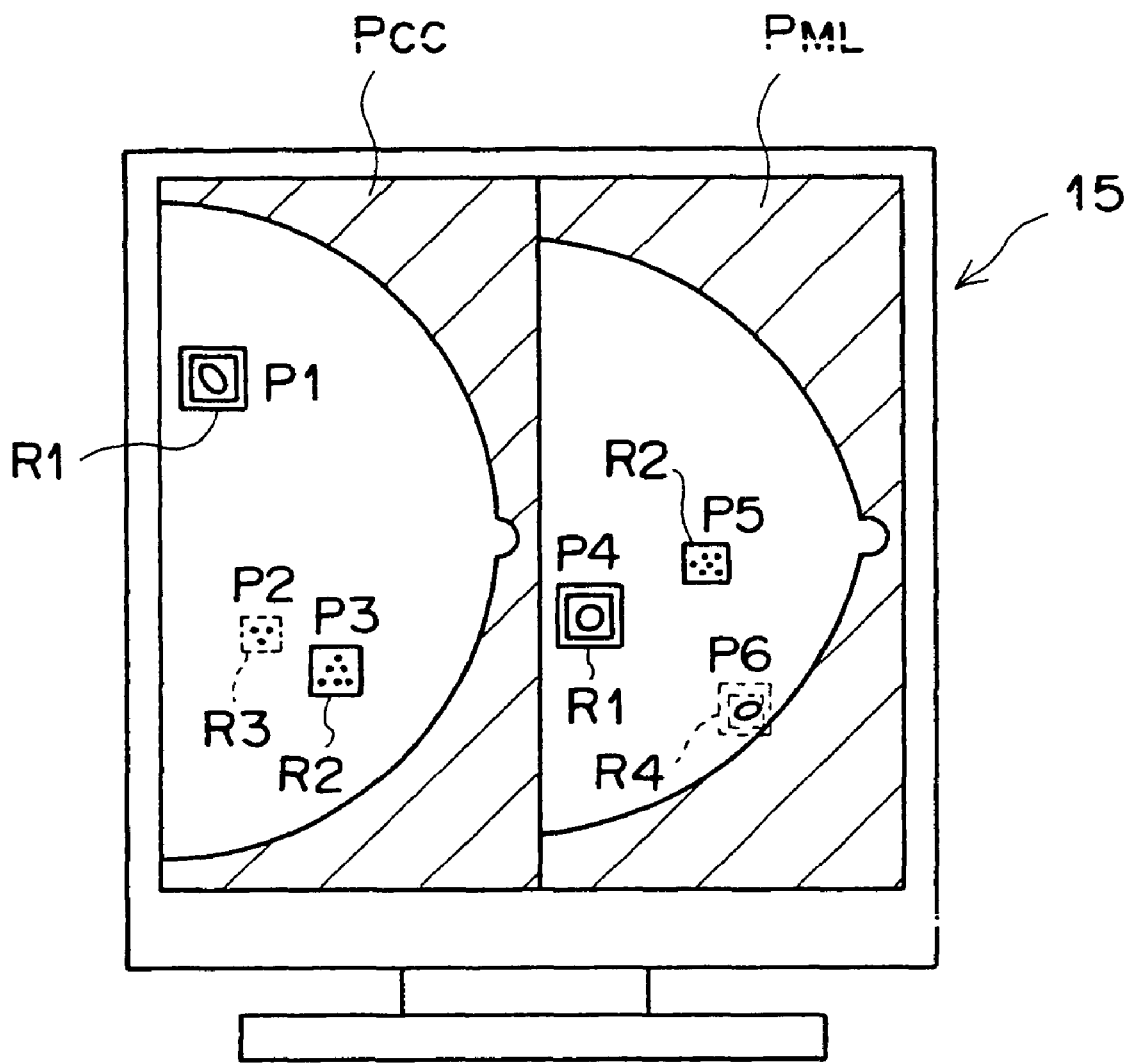
FIG. 4 is a view showing an example of reproduction of the final prospective abnormal shadow and the primary prospective abnormal shadow.

The reproduction control means 14 controls the display means 15 and the laser printer 16 to reproduce the prospective abnormal shadows so that the final prospective abnormal shadows are distinguishable from the primary prospective abnormal shadows. In this particular embodiment, the reproduction control means 14 controls the display means 15 and the laser printer 16 to reproduce the prospective abnormal shadows with the square frames circumscribing the final prospective abnormal shadow shown in the solid line and those circumscribing the primary prospective abnormal shadows shown in the broken line as shown in FIG. 4. When the display means 15 and the laser printer 16 can reproduce a color image, the reproduction control means 14 may control the display means 15 and the laser printer 16 to reproduce the square frames circumscribing the final prospective abnormal shadows and the primary prospective abnormal shadows in different colors. The layout setting means 13 may separates the final prospective abnormal shadows from the primary prospective abnormal shadows by arrows. In this case, the reproduction control means 14 may control the display means 15 and the laser printer 16 to reproduce the arrows pointing the final prospective abnormal shadows and the primary prospective abnormal shadows in different colors. The reproduction control means 14 may reproduce the final prospective abnormal shadows to be distinguishable from the primary prospective abnormal shadows by controlling the display means 15 and the laser printer 16 to reproduce only the final prospective abnormal shadows.

Operation of the prospective abnormal shadow detecting system 10 of this embodiment will be described, hereinbelow.

Two mammograms $P_{CC}$ and $P_{ML}$ of one object such as shown in FIGS. 2A and 2B are input into the primary prospective abnormal shadow detecting means 11A. The primary prospective abnormal shadow detecting means 11A detects a primary prospective growth shadow P1 in the mammogram $P_{CC}$ and primary prospective growth shadows P4 and P6 in the mammogram $P_{ML}$. At the same time, the primary prospective abnormal shadow detecting means 11A detects a primary prospective micro calcification shadows P2 and P3 in the mammogram $P_{CC}$ and primary prospective micro calcification shadow P5 in the mammogram $P_{ML}$.

The position correspondence calculating means 12 detects the position of the nipple PN in each of the mammograms $P_{CC}$ and $P_{ML}$ on the basis of the image signals representing the mammograms $P_{CC}$ and $P_{ML}$ and determines correspondence of positions on the breast between the mammograms $P_{CC}$ and $P_{ML}$ in the lateral direction as seen in FIGS. 2A and 2B on the basis of the positions of the nipple PN in the mammograms $P_{CC}$ and $P_{ML}$.

Figure 3A:
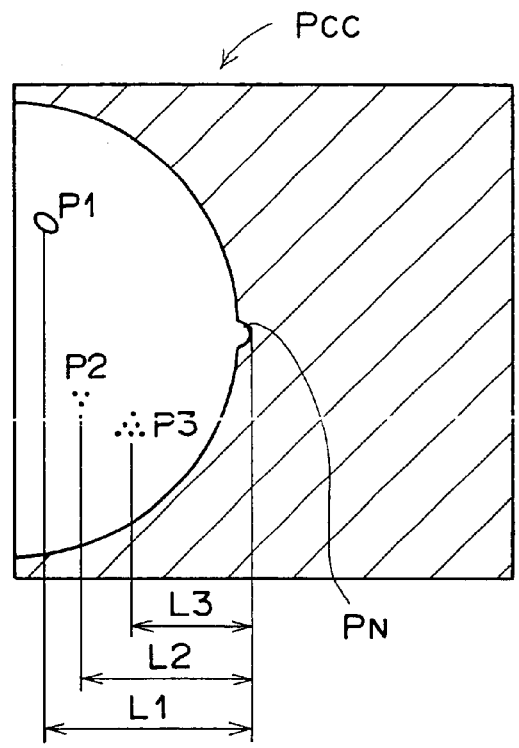
FIGS. 3A and 3B are views for illustrating the position correspondence of the primary prospective abnormal shadows detected in the mammograms shown in FIGS. 2A and 2B.
Figure 3B:
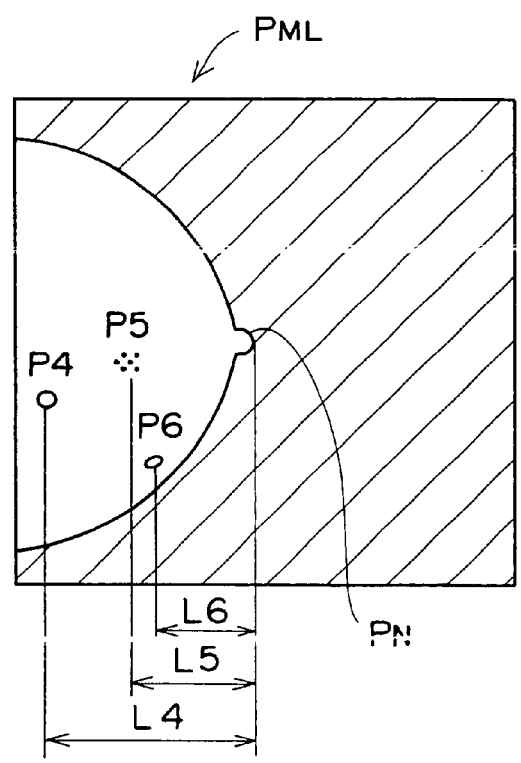

Then the final prospective abnormal shadow detecting means 11B determines the distances L1 to L3 (FIG. 3A) from the nipple PN of the primary prospective growth shadow P1 and the primary prospective micro calcification shadows P2 and P3 in the mammograms $P_{CC}$ and the distances L4, L6 and L5 (FIG. 3B) from the nipple PN of the primary prospective growth shadows P4 and P6 and the primary prospective micro calcification shadow P5 in the mammograms $P_{ML}$. The final prospective abnormal shadow detecting means 11B takes the primary prospective growth shadows P1 and P4 in the mammograms $P_{CC}$ and $P_{ML}$ which are in substantially the same position on the breast (L1≈L4) as a final prospective growth shadow and takes the primary prospective micro calcification shadows P3 and P5 in the mammograms $P_{CC}$ and $P_{ML}$ which are in substantially the same position on the breast (L3≈L5) as a final prospective micro calcification shadow.

The final prospective growth shadows P1 and P4 and the final prospective micro calcification shadows P3 and P5 are input into the layout setting means 13 together with the primary prospective abnormal shadows P2 and P6 and the mammograms $P_{CC}$ and $P_{ML}$ and the layout setting means 13 sets the layout so that the mammograms $P_{CC}$ and $P_{ML}$ are reproduced side by side with each of the prospective growth shadows P1, P4 and P6 circumscribed by a double square frame and each of the prospective micro calcification shadows P2, P3 and P5 circumscribed by a single square frame.

Then the reproduction control means 14 controls the display means 15 and the laser printer 16 to reproduce the prospective abnormal shadows with the double square frames circumscribing the final prospective growth shadows P1 and P4 shown in the solid line (R1), the double square frame circumscribing the primary prospective growth shadow P6 shown in the broken line (R4), the single square frames circumscribing the final prospective micro calcification shadows P3 and P5 shown in the solid line (R2), and the single square frame circumscribing the primary prospective micro calcification shadow P2 shown in the broken line (R3).

Then the display means 15 and the laser printer 16 reproduce in one frame or in one page the mammograms $P_{CC}$ and $P_{ML}$ in the manner described above.

Thus the reader can easily read the more probable prospective abnormal shadows from the reproduced images.

Further, in this particular embodiment, the mammograms $P_{CC}$ and $P_{ML}$ taken in different directions are reproduced side by side and accordingly, the reader can recognize correspondence between the prospective abnormal shadows at a glance.

Though, in the embodiment described above, the mammograms $P_{CC}$ and $P_{ML}$ are reproduced side by side, they may be reproduced in other ways so long as they are reproduced so that the final prospective abnormal shadows can be distinguished from the primary prospective abnormal shadows. For example, the mammograms $P_{CC}$ and $P_{ML}$ may be reproduced in different frames or pages. In the case of the display means 15, the mammograms $P_{CC}$ and $P_{ML}$ may be automatically or manually switched.

Figure 5A:
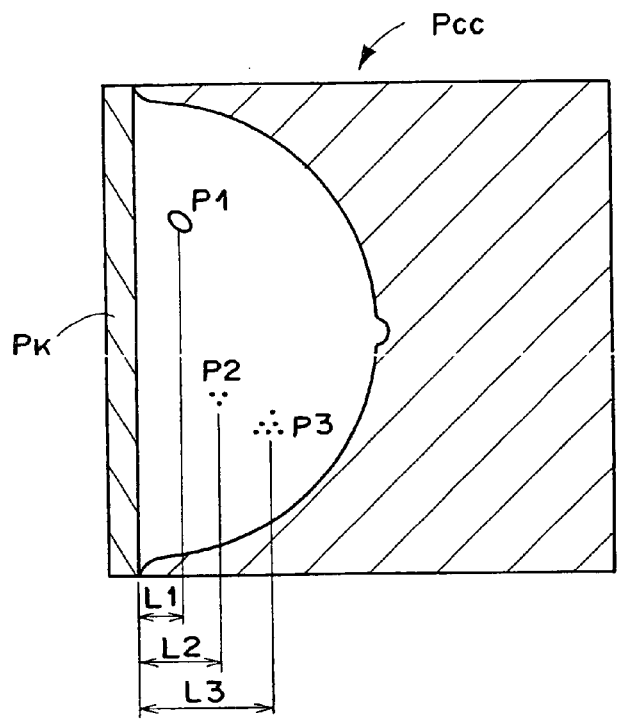
FIGS. 5A and 5B are views for illustrating calculation of the position correspondence on the basis of the boundary between the chest wall and the breast.
Figure 5B:
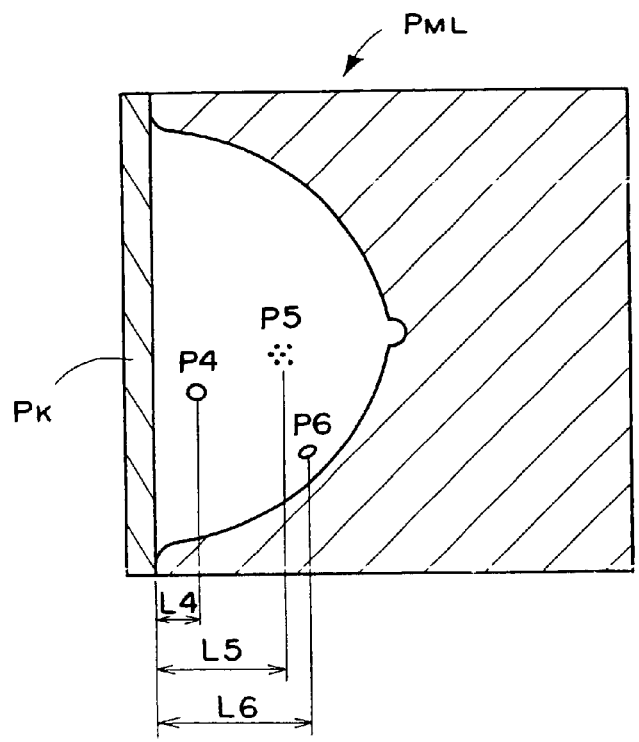

Further, in the embodiment described above, the position correspondence is determined on the basis of the nipple PN, the position correspondence may be determined on the basis of the boundary PK between the breast and the chest wall as shown in FIG. 5. Whether two primary prospective abnormal shadows in the respective mammograms $P_{CC}$ and $P_{ML}$ are in substantially the same position may be determined on the basis of the distance from the nipple PN or the chest wall PK or on the basis of the ratio of the distance from the nipple PN to the distance from the chest wall PK. The latter is preferred since the distance from the reference position can differ according to the state of compression of the breast.

Though in the embodiment described above, the position correspondence is determined for only the primary prospective abnormal shadows, the position correspondence for the entire positions of the mammograms $P_{CC}$ and $P_{ML}$ may be determined in advance and whether two primary prospective abnormal shadows in the respective mammograms $P_{CC}$ and $P_{ML}$ are in substantially the same position may be determined on the basis of the position correspondence for the entire positions of the mammograms $P_{CC}$ and $P_{ML}$ as shown in FIG. 6.

The present invention need not be limited to the illustrated embodiments but may be carried out in various ways. For example, the final prospective abnormal shadows may be output as data without reproduced by a display means or a printer. Further, the data may be represent the positions of the primary prospective abnormal shadows in addition to the positions of the final prospective abnormal shadows.

What is claimed is:

1. A prospective abnormal shadow detecting system comprising
   a primary prospective abnormal shadow detecting means which detects a primary prospective abnormal shadow in each of at least two radiation images of an object taken in different directions;
   a position correspondence calculating means which determines correspondence of positions on the object between the radiation images; and
   a final prospective abnormal shadow detecting means which takes, as a final prospective abnormal shadow, only prospective abnormal shadows which are detected in the respective radiation images and are in substantially the same position on the object.

2. A system as defined in claim 1 in which the at least two radiation images comprises a cranio-caudal view of the breast taken in a lateral direction and a medio-lateral view or a medio-lateral oblique view taken in a vertical direction,
   wherein only when the primary prospective abnormal shadows detected in the respective radiation images are in substantially the same position on the object and at the same time are detected to be the prospective abnormal shadows of the same kind, the final prospective abnormal shadow detecting means takes them as the final prospective abnormal shadow.

3. A system as defined in claim 1 in which only when the primary prospective abnormal shadows detected in the respective radiation images are in substantially the same position on the object and at the same time are detected to be the prospective abnormal shadows of the same kind, the final prospective abnormal shadow detecting means takes them as the final prospective abnormal shadow.

4. A system as defined in claim 1 further comprising a reproduction control means which controls a reproducing means to reproduce the final prospective abnormal shadow to be distinguishable from the primary prospective abnormal shadows.

5. A system as defined in claim 4 in which the reproduction control means is provided with a layout setting means which causes the reproducing means to reproduce the final prospective abnormal and the primary prospective abnormal shadows side by side.

6. A system as defined in claim 4 in which there producing means is of a type which reproduces an image on a display screen.

7. A system as defined in claim 1 in which a determining means which determines a degree of sureness of detection for the prospective abnormal shadows is provided, and when the primary prospective abnormal shadow detecting means detects a prospective abnormal shadow in two or more radiation images and the final prospective abnormal shadow detecting means takes as a final prospective abnormal shadow only prospective abnormal shadows which are detected in all the radiation images and are all in substantially the same position on the object, the display means increases the degree of sureness of detection.

8. A system as defined in claim 1 in which the at least two radiation images comprises a cranio-caudal view of the breast compressed in a lateral direction and a medio-lateral view or a medio-lateral oblique view of the breast compressed in a vertical direction.

9. A system as defined in claim 2 in which the kind of prospective abnormal shadow is a tumor growth shadow.

10. A system as defined in claim 9 further comprising detecting said tumor growth shadow by evaluating the convergence of density gradient vectors in a digital image signal of said radiation images.

11. A system as defined in claim 2 in which the kind of prospective abnormal shadow is a micro-calcification shadow.

12. A system as defined in claim 10 further comprising detecting said micro-calcification shadow by carrying out a morphology operation on a digital image signal of said radiation images including one or more of dilation processing, erosion processing, opening processing, and closing processing.

13. A prospective abnormal shadow detecting system comprising:
   a primary prospective abnormal shadow detecting means which detects a primary prospective abnormal shadow in each of at least two radiation images of an object taken in different directions; and
   a position correspondence calculating means which determines correspondence of positions on the object between the radiation images,
   wherein said positions correspond when a ratio of a distance in the first radiation image of the prospective abnormal shadow from a first reference position to a distance of the prospective abnormal shadow from a second reference position is equal to the ratio of the distance in the second radiation image from a reference position to the distance of the prospective abnormal shadow from a second reference position.

14. A system as defined in claim 13 wherein the distance of the prospective abnormal shadow from the first reference position in the first radiation image does not equal the distance of the prospective abnormal shadow from the first reference position in the second radiation image;
   and the distance of the prospective abnormal shadow from the second reference position in the first radiation image does not equal the distance of the prospective abnormal shadow from the second reference position in the second radiation image.

* * * * *